Aug. 3, 1943.    M. P. HOLMES    2,325,678
BACK-LASH TAKE-UP FOR CROSS FEED SCREW AND TAPER ATTACHMENT
Filed Aug. 18, 1942    2 Sheets-Sheet 1

Inventor
Morris P. Holmes
by Wright Brown Quinby Way
Attys.

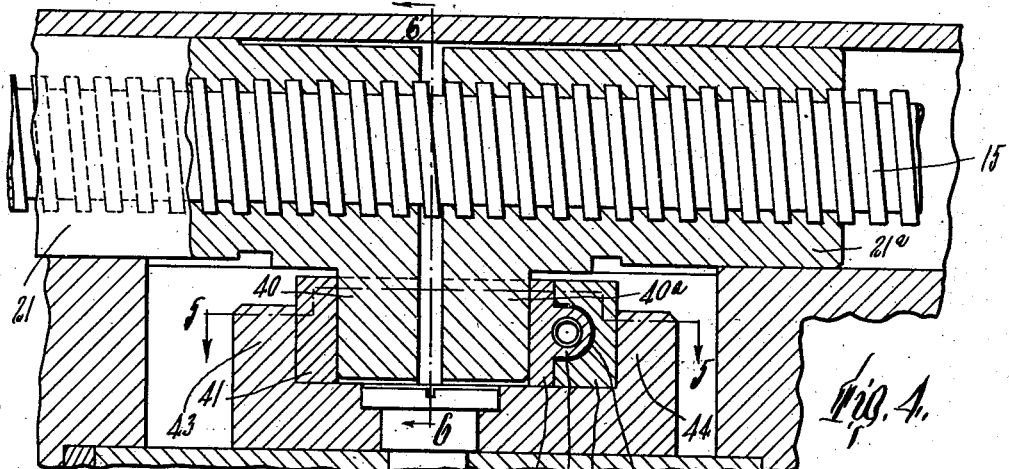
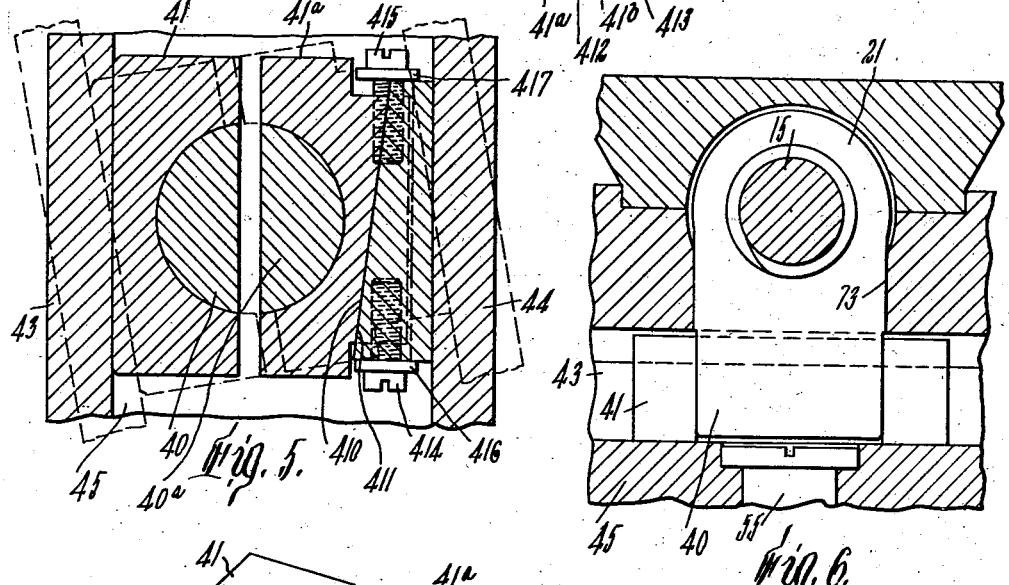
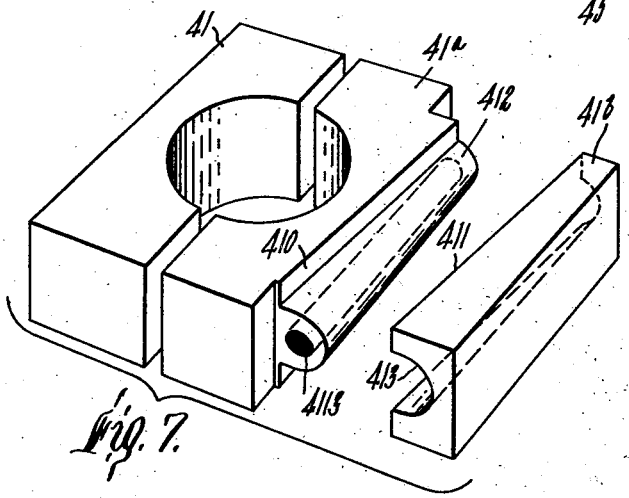

Patented Aug. 3, 1943

2,325,678

UNITED STATES PATENT OFFICE 2,325,678

BACKLASH TAKE-UP FOR CROSS FEED SCREW AND TAPER ATTACHMENTS

Morris P. Holmes, Claremont, N. H., assignor to Jones & Lamson Machine Company, Springfield, Vt., a corporation of Vermont Application August 18, 1942, Serial No. 455,210

4 Claims. (Cl. 82—17)

In the Cheever Patent No. 2,227,178 for Taper attachment for lathes dated December 31, 1940 there is illustrated and described a taper turning attachment for lathes with which is combined a lead screw journaled in the cross slide by the turning of which the cross slide may be moved in or out to produce a feed or retraction of the cross slide independent of the traverse motion. This lead screw is threaded through an elongated nut, so that when this nut is clamped to the traversing carriage rotation of the feed screw is effective to move the slide. This nut may be released from the traversing carriage, however, and a cam follower block carried by it may then be caused to traverse a former cam as the carriage traverses so that such traverse moves the cross slide in definite relation to the traverse to produce a taper cut, the taper depending on the angular setting of the cam to the direction of traverse.

The present invention has for an object to provide means for taking up back-lash between the cam follower and the former cam.

A further object is to provide means by which back-lash between the nut and the feed screw is also taken up at the same time.

Still another object is to provide back-lash take-up means which automatically takes up the back-lash between the screw and nut and between the follower and cam to the correct amounts, regardless of the initial amounts of back-lash between the two sets of cooperating parts, so that one set of parts shall not be set too closely together when back-lash between the parts of the other set is taken up. Thus the amount of take-up between the parts of each set is automatically divided properly between them.

For a more complete understanding of this invention, reference may be had to the accompanying drawings in which Figure 1 is a fragmentary top plan view of a lathe embodying the invention and showing the cross slide and former cam mechanism.

Figures 2, 3 and 4 are detail sectional views on the correspondingly numbered section lines of Figure 1, Figure 4 being to a larger scale.

Figures 5 and 6 are detail sectional views on the correspondingly numbered section lines of Figure 4.

Figure 7 is a perspective view of the cam block parts and the adjusting gib.

Figure 1:
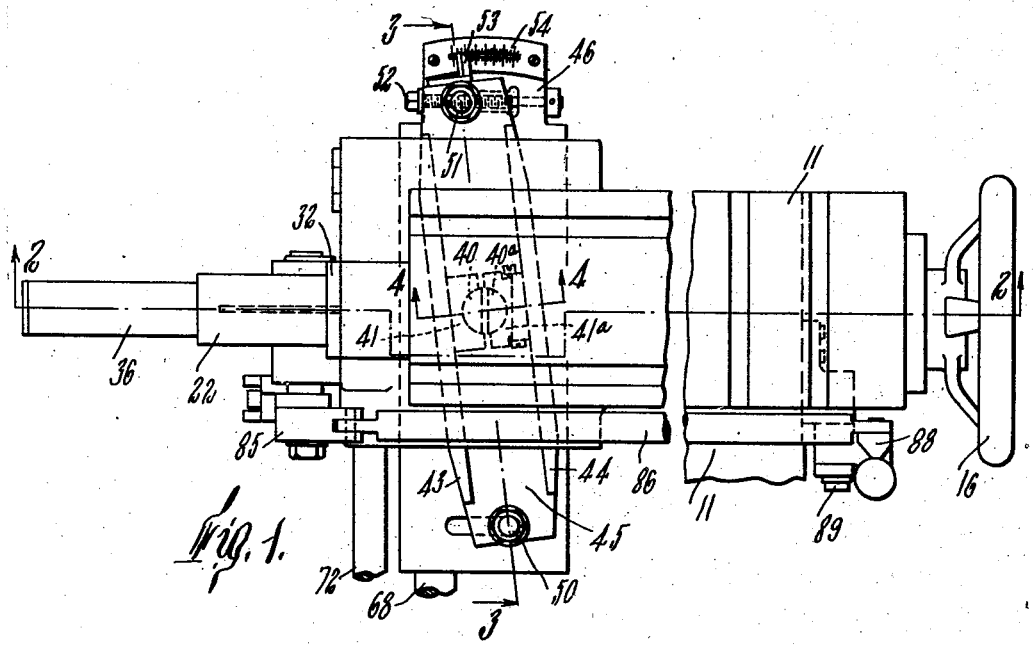
Figure 2:
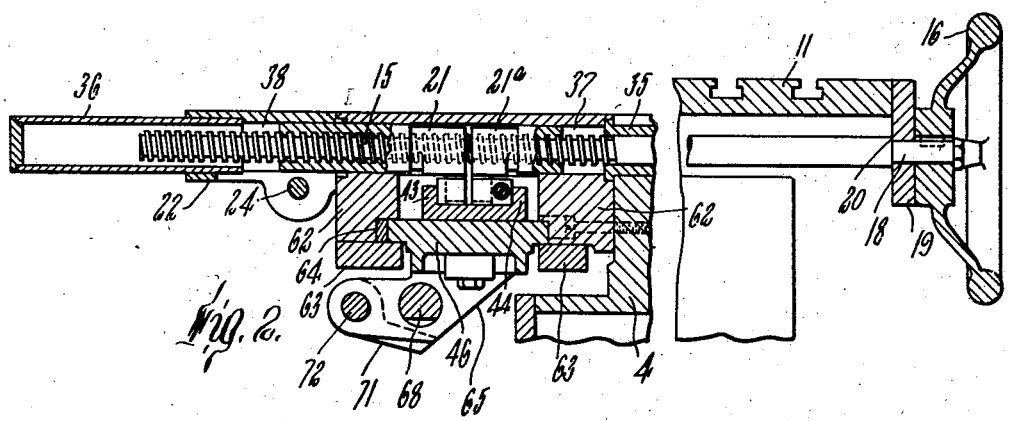

As shown in the Cheever patent to which reference has been made, a traversing carriage 4 is mounted on suitable ways on the bed of the lathe. This carriage may be moved to produce such traverse in any suitable way not herein shown, for example, as shown in that patent. Slidable on ways transverse to the traversing direction of the carriage is a tool carrier or cross slide 11. This carrier may be fed relative to the carriage when desired wholly independent of the traverse of the carriage, or where it is desired to produce taper turning, means are provided for effecting a feed motion of the carrier proportional to and controlled from the traverse of the carriage. The feed motion of the tool carrier or slide may be produced independently of the traverse of the carriage by rotation of a feed screw 15 journaled in the carrier or slide and axially fixed with relation thereto. This turning may be effected by rotation of the hand feed wheel 16 which is secured to the outer reduced extremity 18 of the feed shaft, this reduced extremity being journaled in an end plate 19 of the cross slide or carrier which butts against the shoulder 20 of the feed screw formed by reduction in diameter of its outer end. This feed screw 15 is threaded through a two-part nut member comprising the parts 21 and 21a which function as a unit during the rotation of the screw 15, but are arranged to be moved toward each other from a normally spaced position shown in order to take up back-lash between the nut and the feed screw. This nut 21, 21a may be held against axial movement relative to the traversing carriage 4 and when so held rotation of the screw 15 will produce an axial motion of this screw, thus producing a feed or retractive motion of the cross slide or carrier 11. Such holding of the nut 21, 21a against axial motion relative to the carriage 4 may be produced by tightening against the outer end of the part 21 a clamp collar 22 which is secured to the carriage 4 by any suitable means, for example, as shown in the Cheever patent hereinbefore mentioned, by screws extending into a member secured to the slide 4 through a flange 32 (Figure 1) integral with the clamp collar. As shown this clamp collar is split and the split portions may be brought together by means of a screw 24 as fully set forth in the Cheever patent. The collar 22 is thus held against axial motion so that when it is clamped against the nut 21, 21a, this nut is also held against such motion. When this clamping collar is released the nut 21, 21a is free to be moved axially by rotation of the screw 15 for a limited distance determined by the spacing of opposite ends of this nut from a sleeve 35 (Figure 2) in which the screw 15 is journaled and from a tubular casing 36 which houses the rear end of the screw 15. These spaces are shown at 37 and 38, respectively.

Figure 3:
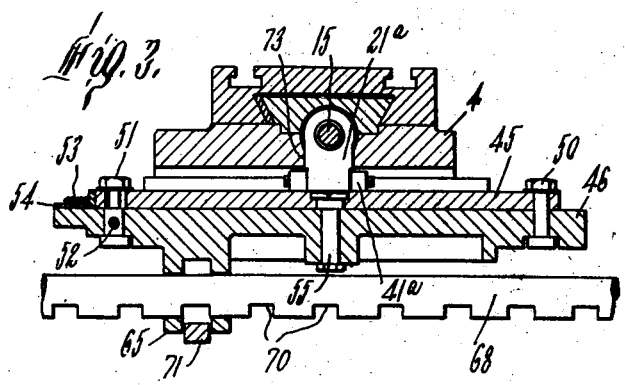

The taper turning attachment is constructed to move the nut 21, 21a axially in accordance with the traversing motion of the carriage 4, and for this purpose each section of the nut 21, 21a has an element 40, 40a, each of these elements being segmental in form and as shown of somewhat less than one-half of a cylinder, so that when the nut elements 21 and 21a are most widely separated, their cylindrical peripheries do not extend outwardly beyond a common cylindrical circumference. Upon these two elements 40 and 40a are rockably mounted the parts 41 and 41a of a cam follower. These parts 41 and 41a represent two parts of a three-part follower, the other part being represented by a gib 41b. Together these parts produce a substantially rectangular block which rides between upwardly extending side wall members 43 and 44 of a former cam 45. This former cam is adjustably secured to a bracket member 46, the adjustability permitting it to be arranged at the desired angle to the direction of traverse of the carriage 4 to control the amount of taper correspondingly. It is shown as secured at one end through a bolt and slot connection at 50, and its opposite end may be provided with a pivot member 51 through which may be extended an adjusting screw 52, by the turning of which the corresponding end of the former cam may be adjusted to bring a pointer thereon at 53 in desired relation to an arcuate scale 54 mounted on the bracket 46, by means of which the amount of taper for any particular angular adjustment of the former cam may be indicated. This cam may be fulcrumed adjacent to its center to the carriage 4 as by a pivot bolt 55. This bracket 46 is slidably mounted with reference to the carriage 4 in the direction of traverse of the carriage, the carriage being provided with depending webs 62, to the lower edges of which are secured retaining bars 63 which support the side edge portions of the bracket 46. A gib 64 may be employed to afford a sliding fit to the bracket 46 with reference to the carriage 4. As pointed out in the Cheever patent, this bracket 46 may be fixed so that the carriage as it traverses moves relative thereto. This may be done by locking the bracket to a stationary bar 68 provided with notches 70 on its under face and into any of which a locking finger 71 may be projected. This locking finger is keyed to a rock shaft 72, journaled in an extension 65 of the bracket 46. When the finger 71 is in its lifted position in engagement with any selected of the notches 70, the bracket 46 is held stationary during the traverse of the carriage, and as the carriage carries with it the nut 21, 21a and the follower 41, 41a and 41b, while the former cam is held stationary through the bracket 46, any angularity of this former cam or bar will cause a corresponding axial motion to the nut 21. As this nut is held from rotation by the engagement in the slot 73 in the carriage 4 (see Figure 3), this will result in axial motion of the feed shaft 15, and provided this feed shaft is not rotated, a corresponding in and out feed motion of the tool carrier 11.

It will be noted that the follower portions 41a and 41b have mating oppositely tapered faces 410 and 411. The block element 41a furthermore has a rib 412 which fits within a corresponding socket 413 in the block member 41b. The rib 412 has a threaded opening therethrough at 413 within which may be engaged the adjusting screws 414 and 415. The rib 412 is shorter than the element 41b so that collars 416 and 417 on the screws 414 and 415 engage the ends of the element 41b. Thus by manipulation of the screws 414 and 415, the element 41b may be moved lengthwise with reference to the mating block 41a so that it can be made to take up any lost motion of the parts 41, 41a and 41b between the side wall members 43 and 44 of the former cam.

It will be noted, also, that the follower block members 41 and 41a engage against the remote faces of the elements 40 and 40a so that adjustment of the member 41b axially not only takes up any lost motion between the follower block and the former cam, but it also presses the elements 40 and 40a toward each other, thus moving the nut elements 21 and 21a toward each other and taking up any lost motion between these parts and the feed screw 15. Thus lost motion between the nut and the feed screw, and between the cam follower and the former cam, are both taken up by adjustment of the same member and each to the extent of its own lost motion, the adjustment being divided between them in accordance with the requirements of each and automatically without any attention on the part of the operator.

As pointed out in the Cheever patent hereinbefore mentioned, the bracket 46 may be held against axial motion and the nut 21, 21a freed for axial motion simultaneously when it is desired to employ the taper turning adjustment, and conversely when it is desired to throw the taper attachment out of operation, the parts are conditioned for hand feed of the tool slide by turning the hand wheel 16. To this end the clamp screw 24 which is employed to tighten or loosen the clamp collar 22 with respect to the nut element 21, has connected thereto an arm 85 to which is pivoted the rear end of an actuating bar 86 to the forward end of which is pivoted an actuating handle 88 fulcrumed at 89 on the forward face of the cross tool slide 11. This screw 24 is also connected through suitable linkage to the rock shaft 72 so that when the handle 88 is in its forward position the collar 22 is locked and holds the nut 21, 21a against axial motion relative to the carriage while the finger 71 is out of engagement with the stationary bar 68, so that the bracket 46 is free to move with the carriage during its traverse. Under these conditions there is no feed of the tool carrier produced by traverse of the traversing carriage, but the tool carrier or cross slide is free to be moved by turning the hand wheel 16. In the opposite position of the handle 88, however, which pushes the rod 86 rearwardly, the clamping engagement of the collar 22 against the nut is released and the finger 71 is brought up into locking engagement with the stationary bar 68. In this position of the parts the feed motion of the tool carrier is coordinated with the traverse of the carriage so that as the carriage traverses, the cross tool slide is moved at a rate dependent upon the angular adjustment of the former cam.

In full lines in Figure 5, the former cam is shown as arranged parallel to the line of traverse of the carriage 4, while in dotted lines is shown an angular position of the former cam which would result, when this former cam is made operative, in taper cutting of the work. If it be desired that this taper be sufficiently steep so that the follower element 41 overlaps the element 40a and the follower element 41a overlaps the element 40, the cylindrical peripheries of the elements 40 and 41 must not extend outwardly beyond a cylindrical circumference at any time. Adjustment of the parts to take up back-lash moves these peripheries inwardly.

From the foregoing description of an embodiment of this invention, it should be evident to those skilled in the art that various changes and modifications might be made without departing from the spirit or scope of this invention.

I claim:

1. In a lathe having a bed, a traversing carriage movable along said bed, a cross slide supported on said carriage, means comprising a feed screw and cooperating nut for feeding said cross slide independently of the motion of said carriage, means comprising a former cam and follower for feeding said cross slide as said carriage traverses, means for selecting which of said feeding means comprising a former cam and follower for at any one time, means for taking up back-lash between said cam and follower, and operative connections causing taking up of back-lash between said cam and follower to also take up back-lash between said screw and nut.

2. In a lathe having a bed, a traversing carriage movable along said bed, a cross slide supported on said carriage, means comprising a feed screw and cooperating multiple part nut for feeding said cross slide independently of the motion of said carriage, means comprising a former cam and multiple part follower for feeding said cross slide as said carriage traverses, means for selecting which of said feeding means shall be operative to move said cross slide at any one time, means for relatively adjusting the parts of said follower to take up back-lash between said cam and follower, and operative connections between the parts of said follower and parts of said nut causing taking up of back-lash between said cam and follower to also take up back-lash between said screw and nut.

3. In a lathe having a bed, a traversing carriage movable along said bed, a cross slide supported on said carriage, and a feed screw journaled in said cross slide, a nut for said feed screw formed of two normally axially spaced sections, a multiple part follower, one of said follower parts engaging each of said sections, a former cam for cooperation with said follower, releasable means for clamping said nut to said carriage, a member movable in the direction of travel of said carriage for supporting said former cam, releasable means for locking said movable member against motion, and means for adjusting one of said multiple cam parts and through certain of said multiple parts said nut parts to take up back-lash between said lead screw and nut and between said follower and former cam.

4. In a lathe having a bed, a traversing carriage movable along said bed, a cross slide supported on said carriage and a feed screw journaled in said cross slide, a nut for said feed screw formed of two normally axially spaced sections, each of said sections having a pivot element, a multiple part follower, two of said follower parts being rockably mounted on said pivot elements, a former cam having spaced guide elements between which said follower slides for cooperation with said follower, releasable means for clamping said nut to said carriage, a member movable in the direction of travel of said carriage for supporting said former cam, releasable means for locking said movable member against motion, two of said follower parts having mating wedge faces, and means for adjusting one of said wedge face parts with respect to the other of said wedge face part to take up lost motion between said follower and former cam spaced elements, and through said pivot elements, lost motion between said sections and said feed screw.

MORRIS P. HOLMES.

CERTIFICATE OF CORRECTION.

Patent No. 2,325,678. August 3, 1943.

MORRIS P. HOLMES.

It is hereby certified that error appears in the printed specification of the above numbered patent requiring correction as follows: Page 3, first column, line 21, strike out the words "comprising a former cam and follower for" and insert instead --shall be operative to move said cross slide--; and that the said Letters Patent should be read with this correction therein that the same may conform to the record of the case in the Patent Office.

Signed and sealed this 7th day of September, A. D. 1943.

(Seal)

Henry Van Arsdale,
Acting Commissioner of Patents.